H. C. PEASE.
LAMP SCREEN.
APPLICATION FILED NOV. 28, 1916.
1,268,145.
Patented June 4, 1918.
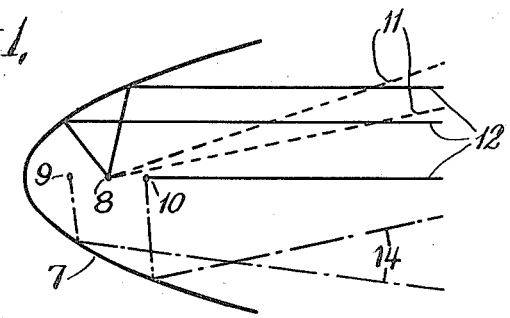
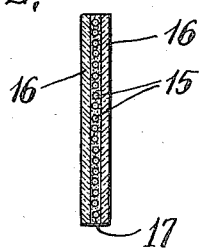
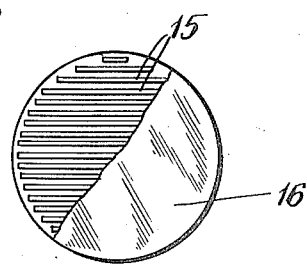
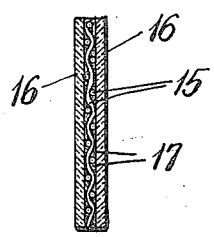
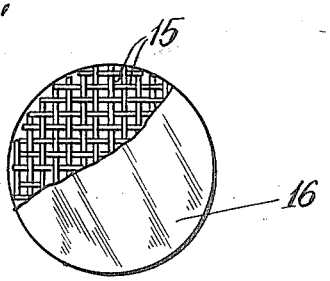

UNITED STATES PATENT OFFICE.

HAROLD C. PEASE, OF SCHENECTADY, NEW YORK.

LAMP-SCREEN.

1,268,145.  Specification of Letters Patent.  Patented June 4, 1918.

Application filed November 28, 1916. Serial No. 133,848.

*To all whom it may concern:*

Be it known that I, HAROLD C. PEASE, a citizen of the United States, residing at 1413 Union street, Schenectady, Schenectady county, State of New York, have invented certain new and useful Improvements in Lamp-Screens; and I do hereby declare the following to be a full, clear, and exact description of the invention, such as will enable others skilled in the art to which it appertains to make and use the same.

This invention relates to optical devices for controlling the transmission, projection and diffusion of light. The invention is directed primarily to the provision of a controlling means for the beam of a headlight, especially an automobile headlight, whereby a superior distribution of the light is secured and the glare or blinding effect experienced by a person approaching the lamp is eliminated or materially reduced.

The broad object of the invention is to provide a novel light-controlling device for interposition in the beam from a source of light when the beam includes a plurality of parallel rays, the function of the device being to modify the beam with particular relation to the parallel rays so as to secure a sufficient illumination of the distant field and at the same time eliminate glare and brilliantly lighted spots.

The invention involves the provision of a novel type of optical screen comprising a plurality of translucent strands so formed and arranged as to constitute slightly separated, elongated refracting and diffracting strands or elements. This screen may consist of a single group of parallel strands or several groups with the strands of one group intersecting those of another. By means of such a screen, I have found that the beam from a source of light may be ideally controlled to satisfy various exacting conditions and requirements. Many of the parallel rays of light emanating directly from the source of light or reflected by the parabolic reflector pass through the screen without refraction by passing through the spaces between the parallel and separated translucent strands. These direct rays serve to illuminate the distant field and the degree of illumination of that field is determined by the proportion of the total amount of parallel light rays which are allowed to pass unreflected through the screen in this manner. This is in turn dependent upon the spacing of the strands in the screen or the fineness of the weave of the fabric when a screen of woven fabric is employed. The remainder of the parallel rays and all or practically all of the divergent rays pass into and through the translucent strands of the screen and are refracted thereby. These rays of light are thoroughly diffused by being deflected by the strands of the screen, thus producing a diffused light of sufficient brilliance for the illumination of the nearer field but one which is free from spots of great brilliance and will not have a blinding effect upon a person approaching the lamp.

Various materials may be employed in the translucent strands of the screen. I have found silk thread and strands of paper of circular cross-sections well adapted to this use, particularly as these materials are absorbent and may have their translucency increased by impregnating them with a suitable transparent liquid.

The translucent strands of the screen may consist of a single series of parallel strands or several series of parallel strands with those of one series intersecting those of the other or others. Preferably two series of strands are employed, one crossing the other at right angles thereto and the two series being interwoven to form a fabric. When such a screen is employed in an automobile headlight with one set of strands disposed vertically and the other horizontally, two relatively narrow zones or belts of slightly increased illumination are produced, one extending vertically and the other horizontally and the two intersecting on a line extending horizontally from the source of light. The position of the headlight on its support may be such that these paths of increased illumination aid in illuminating the field directly in front of the lamp but do not produce a blinding effect upon a person in front of the lamp but not directly in line therewith. If a single series of translucent strands disposed vertically be employed, there will be a single zone of increased illumination disposed vertically. Also, more than two series of parallel strands may be employed in the screen intersecting each other at equal angles of less than 90 degrees in which case a correspondingly greater number of zones of increased illumination will be produced.

The embodiment of the invention which I prefer for use in headlights of automobiles consists of a rigid transparent support having the screen of translucent threads mounted thereon. The support preferably consists of two panes of glass between which the screen is mounted, the space between the two panes and around the screen being entirely filled and the parts being held together by a suitable transparent cement. The screen may be a woven fabric composed merely of a warp and a weft of parallel silk threads. This screen is placed between two panes of glass and the space about the screen is entirely filled with a transparent cement, such as balsam fir; this cement not only secures the screen and the panes of glass together and excludes air from about the screen but also it impregnates the silk threads and increases the translucency thereof.

The invention will be better understood by reference to the following description taken in connection with the accompanying drawing which illustrates screens embodying the invention.

In these drawings, Figure 1 is a diagrammatic view of a parabolic reflector having a source of light therein and characteristic light rays; Fig. 2 is a side elevation of a screen having a single series of refracting strands; Fig. 3 is a front elevation of this screen, broken away in part; Figs. 4 and 5 are views similar to Figs. 2 and 3, respectively, showing a screen comprising two series of interwoven refracting strands.

In Fig. 1, a parabolic reflector is indicated as arranged in position about a suitable source of light including the light points 8, 9 and 10. The broken lines 11 indicate divergent unreflected rays. The full lines 12 indicate parallel rays emanating from the source of light direct or reflected by the parabolic reflector. The dot and dash lines 14 indicate divergent rays reflected by the parabolic reflector, their divergence being due to the fact that the points of light in which they originate are not in the true focus of the reflector.

The screen shown in Figs. 2 and 3 consists of a single series of parallel translucent strands 15 of circular cross-section mounted and held in place between front and rear panes or lenses 16. These strands 15 are preferably silk threads impregnated with some material which increases their translucency and they are held in place between the panes or lenses 16 by a transparent cement 17, such as balsam fir.

In Figs. 4 and 5, a screen is shown similar to that illustrated in Figs. 2 and 3 except that the screen consists of two series of translucent strands of circular cross section crossing each other at right angles, these two series of strands being interwoven to form a fabric.

With a screen constructed as above described, many of the parallel rays 12 pass through the screen without refraction through the spaces between adjacent strands 15. These parallel unrefracted rays 12 serve to illuminate the distant field and the proportion of the total light thus used for the illumination of the distant field may be regulated as desired by choosing the requisite spacing of the strands in the screen in proportion to the diameter of the strands. A substantial proportion of the parallel rays, including all of the parallel rays which do not pass through the spaces between adjacent strands, are intercepted by the strands and refracted thereby. In addition to all of these parallel rays which are intercepted by the translucent strands, practically all of the divergent rays 11 and 14 are intercepted by the translucent strands and refracted thereby. The total effect of this refraction of practically all of the divergent rays and the desired proportion of the parallel rays is to produce a thoroughly diffused light of sufficient illuminating power to give the desired illumination of the nearer field and, at the same time, free from spots of unusual brilliance; and the diffusion and uniformity of the light eliminates the glare and a blinding effect upon a person approaching the lamp.

It will thus be seen that the screen constituting the present invention is such that a certain proportion of the parallel rays of light, which are the rays of greatest intensity, are permitted to pass through the screen unchanged for the purpose of illuminating the distant field to the desired degree and that the remainder of the parallel rays, together with practically all of the divergent rays of less intensity are intercepted, refracted and thoroughly diffused, resulting in the production of a light which sufficiently illuminates the nearer field and which does not produce the objectionable blinding effect.

The filling 17 of transparent cement, preferably balsam fir, is of special importance. It completely fills the spaces between the panes or lenses 16, great care being observed in assembling the parts to prevent any air from remaining between the panes which would appear as bubbles and would cause undesired deflection of the light rays. Furthermore, the balsam fir cement has a light density which is substantially the same as that of glass and therefore the light rays which pass through the spaces between adjacent strands are not deflected. However, the light density of the translucent strands, preferably consisting of silk threads impregnated with the cement, is different from that of the glass and cement and this difference of light density results in a further deflection of the parallel rays which enter the strands and the divergent rays, causing thorough diffusion.

If desired, the screen of the present invention may have combined therewith a suitable means for reducing to an even greater extent the light passing through the upper portion of the screen so as to even more effectively guard against the blinding effect upon a person approaching the lamp. The screen may have the translucent strands in the upper portion thereof of greater diameter and arranged closer together than those in the lower portion; or, a screen of fine mesh may be employed having strands omitted at regular intervals over the lower portion; or, a second screen of the same or a different fabric or consisting of thin paper may be provided covering the upper portion of the main screen. Such an additional second screen may be employed when desired for further cutting down the intensity of the light emanating from the upper portion of the lamp but the thoroughness of the diffusion of the light effected by the several forms of screens herein illustrated and described is such that the use of an additional screen for eliminating the blinding effect upon a person approaching the lamp has been found to be unnecessary.

The construction herein illustrated and described also lends itself to securing various color effects. To this end a suitable coloring material may be introduced into the strands or into the cement surrounding the strands or into the glass supports for the strands or any two or more of them. Or, different coloring materials may be introduced into two of these parts to obtain novel color effects.

I claim:

1. A lamp screen consisting of a translucent support and a plurality of strands of a fibrous material impregnated to increase their translucence, said strands being mounted on the support and spaced apart so as to permit a portion of the parallel rays from the light source to pass undeflected between them while other rays are reflected by the strands; substantially as described.

2. A lamp screen consisting of a pane of glass, a plurality of translucent strands spaced apart mounted thereon, and a translucent filling in the spaces between strands; substantially as described.

3. A lamp screen consisting of a pane of glass, two groups of translucent strands mounted thereon, the strands of each group being spaced apart and those of one group crossing those of the other, and a translucent filling in the spaces between strands; substantially as described.

4. A lamp screen consisting of two panes of glass, a plurality of translucent strands spaced apart between them, and a translucent filling in the space between the two panes and about the strands excluding air from between the two panes; substantially as described.

5. A lamp screen consisting of a pane of glass, a plurality of translucent strands of a light density different from that of glass, the strands being mounted on the pane and spaced apart, and a filling between the strands of substantially the same light density of that of glass; substantially as described.

6. A lamp screen consisting of two panes of glass, a plurality of translucent strands of fibrous material having a light density different from that of glass, the strands being mounted between the two panes of glass and spaced apart, and a filling in the space between the two panes of glass and about the translucent strands, said filling being of a light density which is substantially the same as that of glass; substantially as described.

In testimony whereof I affix my signature.

HAROLD C. PEASE.